(12) United States Patent
Vestergren

(10) Patent No.: US 10,623,615 B2
(45) Date of Patent: Apr. 14, 2020

(54) FASTENING ARRANGEMENT, A FASTENING ARRANGEMENT KIT AND USE OF A FASTENING ARRANGEMENT KIT

(71) Applicant: Axis AB, Lund (SE)

(72) Inventor: Tommy Vestergren, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/229,985

(22) Filed: Dec. 21, 2018

(65) Prior Publication Data

US 2019/0222724 A1 Jul. 18, 2019

(30) Foreign Application Priority Data

Jan. 17, 2018 (EP) .................................... 18151998

(51) Int. Cl.
*H04N 5/225* (2006.01)
*F16M 13/02* (2006.01)
*F16M 11/04* (2006.01)

(52) U.S. Cl.
CPC ......... *H04N 5/2252* (2013.01); *F16M 11/041* (2013.01); *F16M 13/02* (2013.01); *F16M 13/027* (2013.01); *H04N 5/2253* (2013.01)

(58) Field of Classification Search
CPC ... F16C 1/102; F16C 1/105; F21S 8/00; F21S 8/04; F21S 8/043; F21S 8/046; F21S 8/03; F21S 8/033; F21S 8/036; F21S 8/037; F21S 8/022; F21S 8/026; F21S 8/024; F21S 8/02; H04N 5/2252; H04N 5/2253; F16M 11/041; F16M 13/02; F16M 13/027
See application file for complete search history.

(56) References Cited

U.S. PATENT DOCUMENTS

| | | | | |
|---|---|---|---|---|
| 5,934,788 A | * | 8/1999 | Wolfe | ..................... F21V 21/04 248/519 |
| 5,967,640 A | * | 10/1999 | Moriyama | ................ F21S 8/02 362/147 |
| 6,095,660 A | * | 8/2000 | Moriyama | .............. F21S 8/026 362/147 |

(Continued)

FOREIGN PATENT DOCUMENTS

| | | |
|---|---|---|
| CN | 203851205 U | 9/2014 |
| CN | 204272267 U | 4/2015 |

(Continued)

*Primary Examiner* — Chiawei Chen
(74) *Attorney, Agent, or Firm* — Volpe and Koenig, P.C.

(57) ABSTRACT

A fastening arrangement (100), a fastening arrangement kit comprising such a fastening arrangement, in addition to an electronic device, and use of such a fastening arrangement for mounting the electronic device. The fastening arrangement comprises a mounting support (200) for attachment to a mounting surface. The electronic device is attached to the mounting support using a fastener portion. The fastener portion forms part of a connector (400), which is attached to the mounting support by securing an H-shaped attachment portion in an elongated opening. The H-shaped structure is rotated in place in the elongated opening and fixed using at least two stops positioned on either side of the of the attachment portion. The mounting support comprises one of the H-shaped attachment portion and the elongated opening, and the connector comprises the other.

15 Claims, 6 Drawing Sheets

(56) References Cited

U.S. PATENT DOCUMENTS

| | | | |
|---|---|---|---|
| 6,461,016 B1 * | 10/2002 | Jamison | F21S 8/02 362/147 |
| 7,217,045 B2 | 5/2007 | Jones | |
| 7,484,866 B1 * | 2/2009 | Buse | F21S 8/02 362/147 |
| 8,792,050 B2 * | 7/2014 | Shinohara | G03B 17/14 348/373 |
| 2007/0019418 A1 * | 1/2007 | Czech | F21S 8/02 362/364 |
| 2010/0085766 A1 * | 4/2010 | Czech | F21S 8/02 362/365 |
| 2013/0008094 A1 * | 1/2013 | Wood | B61L 5/1863 52/40 |
| 2018/0136610 A1 * | 5/2018 | Guo | G04B 37/00 |

FOREIGN PATENT DOCUMENTS

| | | | |
|---|---|---|---|
| JP | 2014-112470 A | | 6/2014 |
| KR | 2011-0009503 U | | 10/2011 |
| WO | WO-2015182273 A1 | * | 12/2015 |
| WO | 2016/173266 A1 | | 11/2016 |

* cited by examiner

FASTENING ARRANGEMENT, A FASTENING ARRANGEMENT KIT AND USE OF A FASTENING ARRANGEMENT KIT

TECHNICAL FIELD OF THE INVENTION

The present invention relates to the field of fastening arrangements. In particular, it relates to a fastening arrangement comprising a mounting support and a connector, a fastening arrangement kit comprising such a fastening arrangement in addition to an electronic device and use of such a fastening arrangement for mounting an electronic device.

BACKGROUND OF THE INVENTION

Fastening arrangements are used when mounting electronic devices, such as cameras, physical access control devices, loudspeakers, microphones, information boards, to mounting surfaces such as walls, ceilings, poles and other surfaces both indoors and outdoors. The mounting surfaces may be planar, non-planar, vertical, horizontal etc. The electronic devices that are mounted to the surfaces may be electronic devices for monitoring, safety or security, public information distribution, measuring environmental data etc.

This type of fastening arrangements typically comprise a mounting support for attachment to the mounting surface and the electronic device in question is attached to the mounting support. As an example, US 2006/0147194 A1 discloses a camera assembly including a mounting apparatus that is attachable to a mounting surface and a camera head assembly comprising a camera head base for engaging the mounting apparatus.

The various environments and placements of the electronic devices imply that these fastening arrangements need not only to be easy to mount for installers, securely hold the electronic device and be cost effective to produce but also be able to adapt to various changing circumstances for the electronic devices such as different mounting orientations of the electronic devices and different variants of the electronic devices. This as an electronic device supplier may have the same mounting support for various types of products.

Hence, there is a need for further improvements of fastening arrangements.

SUMMARY OF THE INVENTION

In view of the above, an improved fastening arrangement, a fastening arrangement kit and a use of a fastening arrangement kit are presented.

According to a first aspect, a fastening arrangement comprises a mounting support and a connector, wherein the mounting support is adapted for attachment to a mounting surface, has an elongate opening, has a first stop adjacent the opening on a first side of the mounting support, and has a second stop adjacent the opening on the first or a second side of the mounting support, and wherein the connector has a fastener portion, has an H-shaped attachment portion, the attachment portion having a length which is longer than a width of the opening in the mounting support, and wherein by insertion of the attachment portion in the elongated opening in the mounting support, and rotating the attachment portion, the attachment portion is adapted to be arranged with a first leg of the H-shaped attachment portion arranged on the first side of the mounting support, and a second leg of the H-shaped attachment portion arranged on the second side of the mounting support, and wherein during rotation of the attachment portion, the first leg is adapted to pass over the first stop, and after the rotation of the attachment portion, the first stop is adapted to abut a first lateral side of the attachment portion, and, the second stop is adapted to abut a second lateral side of the attachment portion, wherein the first and second lateral sides are located on opposite sides of the attachment portion.

According to a variant of the first aspect, a fastening arrangement comprises a mounting support and a connector, wherein the mounting support is adapted for attachment to a mounting surface, has an H-shaped attachment portion, and, wherein the connector has a fastener portion, has an elongate opening, the elongated opening having a width which is smaller than the length of the attachment portion, has a first stop adjacent the opening on a first side of the mounting support, and, has a second stop adjacent the opening on the first, or, a second side of the mounting support, and, wherein by insertion of the attachment portion in the elongated opening in the connector, and rotating the connector, the attachment portion is adapted to be arranged with a first leg of the H-shaped attachment portion arranged on the first side of the connector, and, a second leg of the H-shaped attachment portion arranged on the second side of the connector, and wherein during rotation of the connector, the first leg is adapted to pass over the first stop, and after the rotation of the connector, the first stop is adapted to abut a first lateral side of the attachment portion, and, the second stop is adapted to abut a second lateral side of the attachment portion, wherein the first and second lateral sides are located on opposite sides of the attachment portion.

There are several advantages with a fastening arrangement according to the first aspect. First, having the mounting support and the fastener in two separable parts makes the fastening arrangement flexible and easy to adapt to different mounting arrangements as the connector comprising the fastener may be connected to the mounting support at various positions on the mounting support (as long as there is a connecting elongated opening or alternatively an H-shaped attachment portion in the position). Flexibility is also offered in that different kinds of fastener portions may be arranged on the mounting support using the same connection principle.

Further, the two separate parts of the fastening arrangement are also an advantage production-wise as the parts may be produced in different materials, so that each part may be made in a material adapted for its respective use. Additionally, the fastener itself need not be integrated in the mounting support, as this would make the structure of the mounting support more complicated and difficult to, e.g., mould or die-cast. The first aspect is hence cost effective to produce.

Further, despite the multiple part arrangement, the fastening arrangement is still easy to assemble, or mount, in a wanted position by an installer, as no additional tools or complicated procedures are needed. The H-shaped attachment portion is placed in the elongated opening and then rotated to lock the connector in a position relative to the mounting support.

Even though it is easy to assemble, or mount, it still offers a secure fastening arrangement for an electronic device to be fastened by the fastening arrangement. The stops and H-shaped attachment structure provide a reliable and secure positioning of the connector, and hence the fastener portion, in relation to the mounting support.

In the following, various embodiments and optional features will be discussed. For the most part, they will be described in the context of the first aspect described above. However, the variant mentioned above, in which the placement of the elongated opening and the H-shaped attachment portion are reversed, may also be embodied in essentially the same ways, and taking advantage of the same optional features.

The fastening arrangement may comprise two spaced-apart elongated openings and two connectors, such that a pair of connectors may be arranged on the mounting support for securely holding an electronic device. For instance, the two elongated openings may be arranged near a periphery of the mounting support, substantially 180° apart. Depending on the design of the electronic device, it may be desirable to use more than two connectors in a corresponding number of spaced-apart elongated openings.

According to a variant of the fastening arrangement, the fastener portion of the connector is fixed to the first leg of the H-shaped attachment portion. This further improves the ease of mounting of the fastening arrangement as the person mounting the connector to the mounting support will have visual feedback of when the first leg has passed over the first stop.

According to another variant of the fastening arrangement, the mounting support has a third stop adjacent the opening on the first, or, a second side of the mounting support for obstructing rotation of the attachment portion in a direction opposite the direction for passing the first leg over the first stop. This also improves the ease of mounting of the fastening arrangement as the person mounting the connector to the mounting support will be guided to rotate the connector in the correct direction for mounting the connector to the mounting support.

A fourth stop adjacent the opening on the first or a second side of the mounting support, may be further added to the mounting support in other variants of the fastening arrangement. The additional stops will further improve the stability of the position of the connector in relation to the mounting support and further reduce the degrees of freedom for movement of the connector in a mounted position.

The second stop may further be arranged as part of an indent in the second side of the mounting support. In addition to the second stop, the third and fourth stops may also be arranged as part of the indent on the second side of the mounting support. This is a particular advantage when the mounting support is mounted to a flat mounting surface as this implies that the second leg will not protrude from the plane of the second side of the mounting support.

According to a variant of the fastening arrangement, the first leg of the H-shaped attachment portion is longer than the second leg of the H-shaped attachment portion. The longer first leg of the H-shaped attachment portion improves the flexibility of the leg which will make it easier to pass the first stop, while the relatively shorter second leg will improve the ease of mounting as it will more easily fit into the elongated opening.

The fastening arrangement according to the first aspect may be produced in various materials. In one variant the mounting support is made of a metallic material, as it may make the mounting support robust and withstand high impacts without breaking, which is needed if the fastening arrangement is to be vandal resistant.

Further, in another variant, the connector is made of a thermoplastic material, as this may give an integrated fastener portion of the connector flexible and resilient mechanical features. An example of a thermoplastic material that is easy to handle in production and has durable features is Polyoxymethylene (POM). POM may hence be a good choice of thermoplastics material to be used for producing the connector.

For a fastening arrangement according to the first aspect, there are various options for fastener portions. In a variant of the fastening arrangement the fastener portion of the connector comprises at least one of a snap fit element, a clamp, a cable holding element, a spring element and a distance element. These are all fastener portions that may provide an easy procedure for fastening an electronic device in a secure and robust manner to the fastening arrangement.

According to a second aspect, a fastening arrangement kit comprising a fastening arrangement according to the first aspect and an electronic device is provided, wherein the electronic device is arranged to be secured to the mounting support in a first setup according to the location of the elongated opening.

The advantages mentioned in relation to the first aspect are also applicable for this second aspect of the invention, and analogue embodiments may be applied. There are various options for electronic devices to be included in the fastening arrangement kit according to the second aspect. According to a variant, the electronic device comprises at least one of a camera, an imaging sensor, a physical access control server, a card reader, a radio signal transceiver, a loudspeaker, a PIR sensor, a RADAR unit, and a microphone.

According to a variant of the second aspect, the mounting support of the fastening arrangement comprises a second elongated opening arranged in a second location on the mounting support, wherein the electronic device is arranged to be secured to the mounting support in a second setup by attaching the connector to the second elongated opening. This provides further advantages in that it offers a fastening arrangement kit in which the positioning of the electronic device is flexible and may be adapted according to conditions specific for a particular use case without adding extra parts to the kit. In the same way as discussed above, the mounting support may be provided with two or more of the second elongated opening, such that, e.g., a pair of connectors may be employed for mounting the electronic device.

According to a third aspect a use of a fastening arrangement kit according to the second aspects is provided.

The advantages mentioned in relation to the first and second aspect of the invention are also applicable for this third aspect of the invention, and analogue embodiments may be applied.

A further scope of applicability will become apparent from the detailed description given below. However, it should be understood that the detailed description and specific examples, while indicating preferred embodiments, are given by way of illustration only, since various changes and modifications within the scope of the specification will become apparent to those skilled in the art from this detailed description. It is further noted that the teachings relate to all possible combinations of features listed in relation to embodiments, variants, alternatives disclosed above or below, unless explicitly stated otherwise or technically impossible.

Hence, it is to be understood that the teachings are not limited to the particular component parts of the device described or steps of the methods described as such device and method may vary. It is also to be understood that the terminology used herein is for the purpose of describing particular embodiments only, and is not intended to be limiting. It must be noted that, as used in the specification and the appended claim, the articles "a", "an," "the", and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of a presently preferred embodiment, with reference to the accompanying drawings, in which.

Further, in the figures like reference characters designate like or corresponding parts throughout the several figures.

DETAILED DESCRIPTION OF EMBODIMENTS

Figure 1:
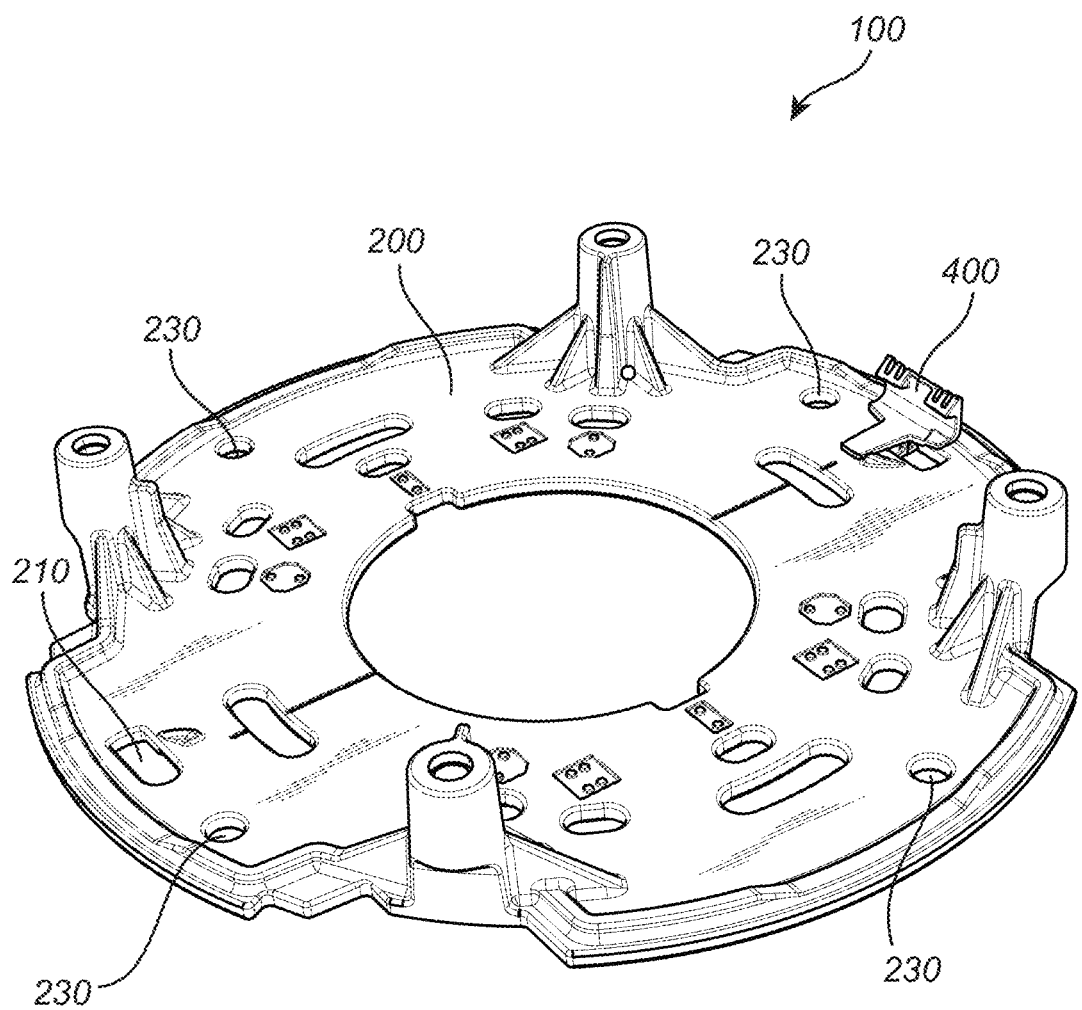
FIG. 1 illustrates an embodiment of a fastening arrangement comprising a mounting support and a connector.

FIG. 1 shows an embodiment of a fastening arrangement 100. The fastening arrangement 100 comprises a mounting support 200 and a connector 400. The mounting support 200 is adapted for mounting, i.e. attachment, to a mounting surface such as a wall, a ceiling, a roof-top, a pole, or other type of structure. The mounting support 200 may, e.g., be die-cast or molded in metal, such as in aluminum, to obtain a light, rigid and robust platform. Metal is an example of a preferred material type as it offers robust material properties that can fulfill the requirements involved in, e.g., vandal-proofing the fastening arrangement. Shock resistance in the event of high impact against the fastening arrangement is a typical property that is evaluated when vandal-proofing a product.

Figure 2:
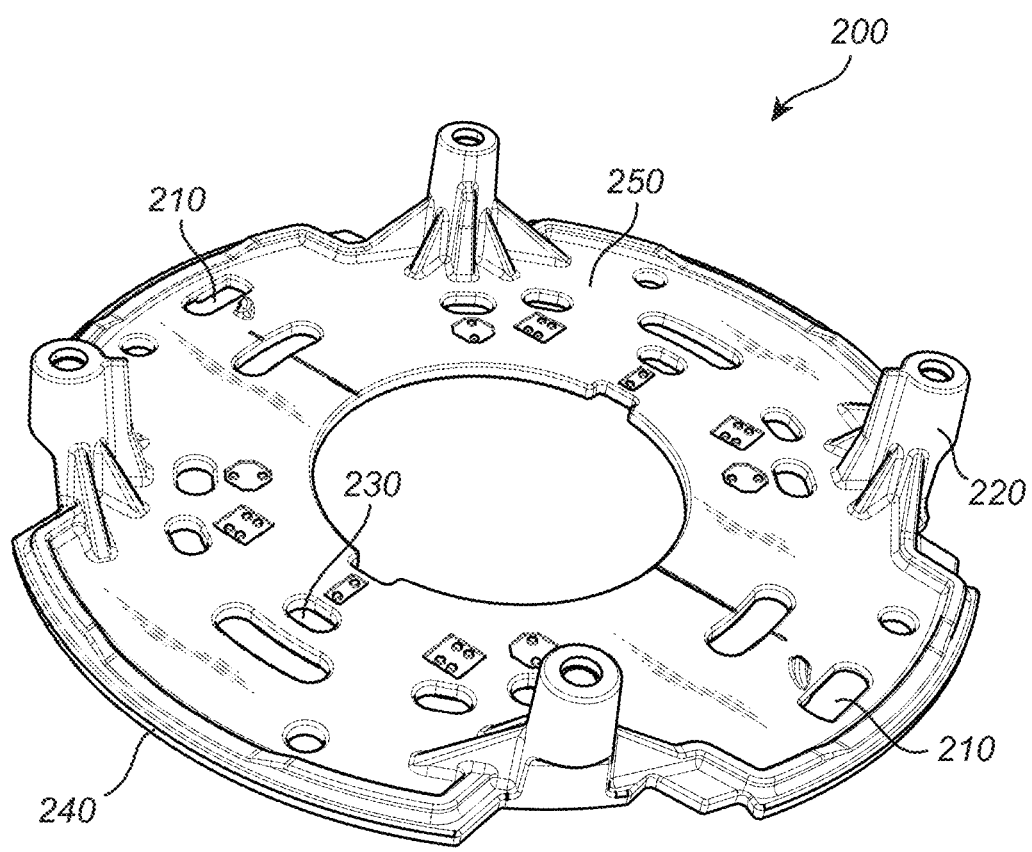
FIG. 2 illustrates an embodiment of a mounting support.

Openings 230 may be arranged in the structure of the mounting support 200 to enable attachment of the support to the mounting surface using bolts, screws, cable ties or other similar fastening means. Other openings 230 and mounting posts 220, see FIG. 2, may also be arranged in the mounting support 200 to enable attachment of electronic devices 510, or parts of electronic devices 510, using various fasteners such as bolts, screws, cable ties or other fastening means. Openings, 230, 210, in the mounting support may be arranged in various set-ups as long as at least one elongated opening 210 in the mounting support 200 is arranged to receive a connector 400.

Examples of electronic devices 510 (see FIG. 5) that may be attached to this type of mounting support are cameras, imaging sensors, physical access control servers, card readers, radio signal transceivers, loudspeakers, PIR sensors, RADAR units and microphones. The term "electronic device" is here also including components of electronic devices such as circuits, chips, cabling and electrical connectors, as the fastening arrangement 100 may be used as a platform to mount, hold or fix several components of an electronic device 510.

In addition to the mounting support 200, the fastening arrangement 100 comprises at least one connector 400, see FIG. 1. The mounting support 200 has at least one elongated opening 210 arranged to receive the connector 400. Depending on the electronic device 510 to be mounted to the fastening arrangement 100, one, two or more pairs of elongated openings 210 and connectors 400 may be used in the fastening arrangement 100. The elongated openings 210 may be formed spaced apart near a periphery of the mounting support 200. The relative placement of the elongated openings should be adapted to the electronic device to be mounted. For instance, if two elongated openings and connectors are used, they may be placed essentially 180° apart.

Figure 4A:
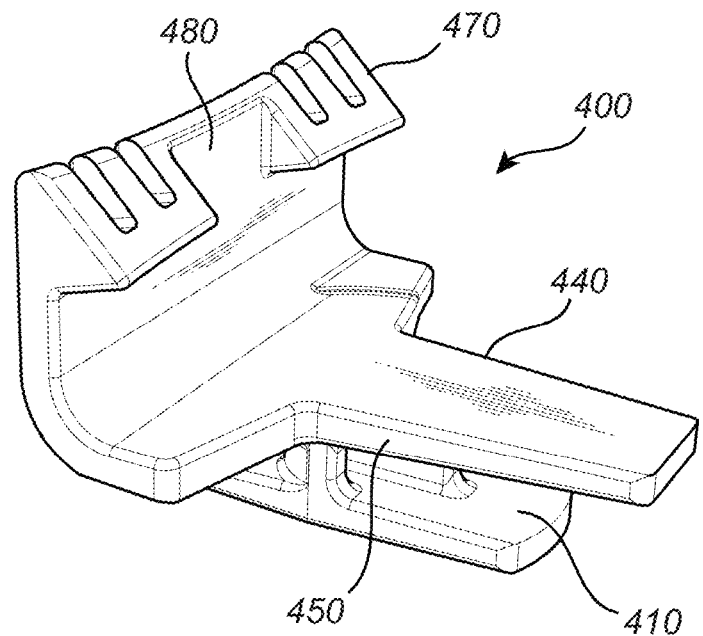
FIG. 4A illustrates a perspective view of an embodiment of a connector.
Figure 4B:
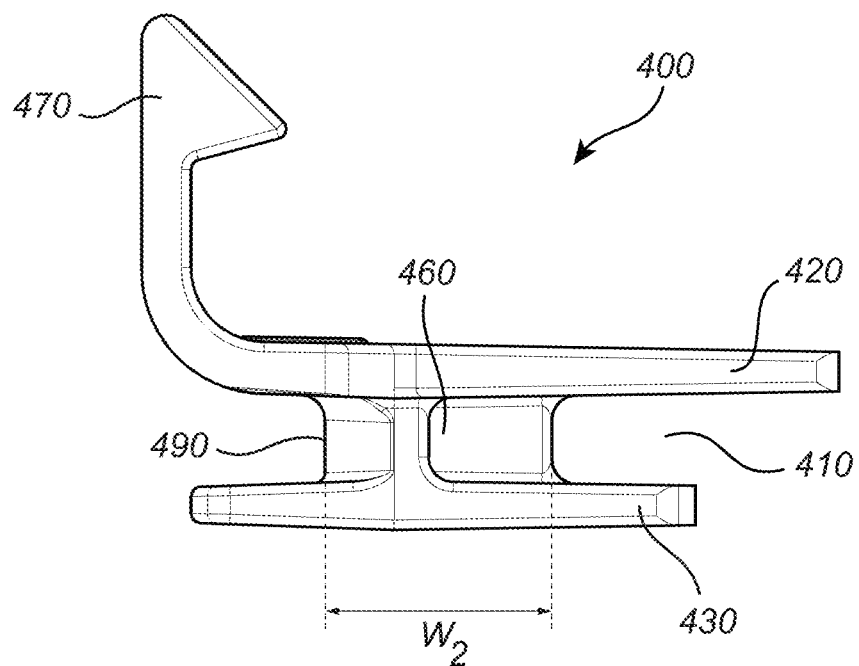
FIG. 4B illustrates a side view of an embodiment of a connector.

The connector 400 has a fastener portion 470 that is used to hold and/or secure the position of the electronic device 510, see FIG. 4A and FIG. 4B. The fastener portion 470 may, e.g., be implemented as a snap fit, as shown in the drawing, or as a cable holding element, a clamp, a distance element, a spring element etc. The fastener portion 470 may hence comprise any means for holding and/or securing the position of an electronic device 510 in a wanted position. Various means for holding, clamping, pushing, securing may hence be further examples of fastener portions 470.

The fastener 470 in FIGS. 4A and 4B is an example of a snap fit type of fastener. That type of fastener is flexible like a spring in its structure and typically has a grip portion that is pushed into an indent, or similar, in the product that is to be secured by the grip portion. The grip portion and indent interlock when the electronic device is pushed towards the mounting platform and the flexible, spring like structure creates a force that pushes the grip portion towards the indent and hence secures the position of the electronic device 510.

In some cases the electronic device 510 is mechanically coupled to the fastener portion, like explained above for the snap fit and indent, in some cases the fastener portion passively supports the position of the electronic device 510, using e.g. a distance element securing the electronic device 510 in a wanted position or preventing the electronic device 510 from being in an unwanted position.

The connector 400 further comprises an H-shaped attachment portion 410, see FIG. 4B. The attachment portion 410 is having a length which is longer than a width of the elongated opening 210 in the mounting support 200. The H-shaped attachment portion 410 is here described as having the shape of the letter "H", as it comprises two parallel legs 420, 430 and a third part 460 connecting the two legs 420, 430, wherein the third part 460 is perpendicular to the two parallel legs 420, 430. For clarity it should however be noted that the third part 460 may be placed in any position along the two parallel legs 420, 430, not necessarily being placed in the mid position, which is the case for the typical "H" letter. For example, the third part 460 may be placed at one of the end points of the two parallel legs 420, 430, typically at end of the second leg 430, closest to the fastener portion 470. The shape of the attachment portion may in these cases also be referred to as a U-shape or a horseshoe-shape, but is here regarded as a special case of an H-shape.

When the attachment portion 410 of the connector 400 is inserted into an elongated opening 210 in the mounting support 200 and rotated, the attachment portion 410 is adapted to be arranged with a first leg 420 of the H-shaped attachment portion 410 arranged on one side of the mounting support 240, and, a second leg 430 of the H-shaped attachment portion 410 arranged on the other side 250 of the mounting support 200. Vice versa, the first leg 420 may of course be arranged on side 250 of the mounting support 200, and the second leg 430 would then be arranged on the side 240 of the mounting support 200.

Figure 3A:
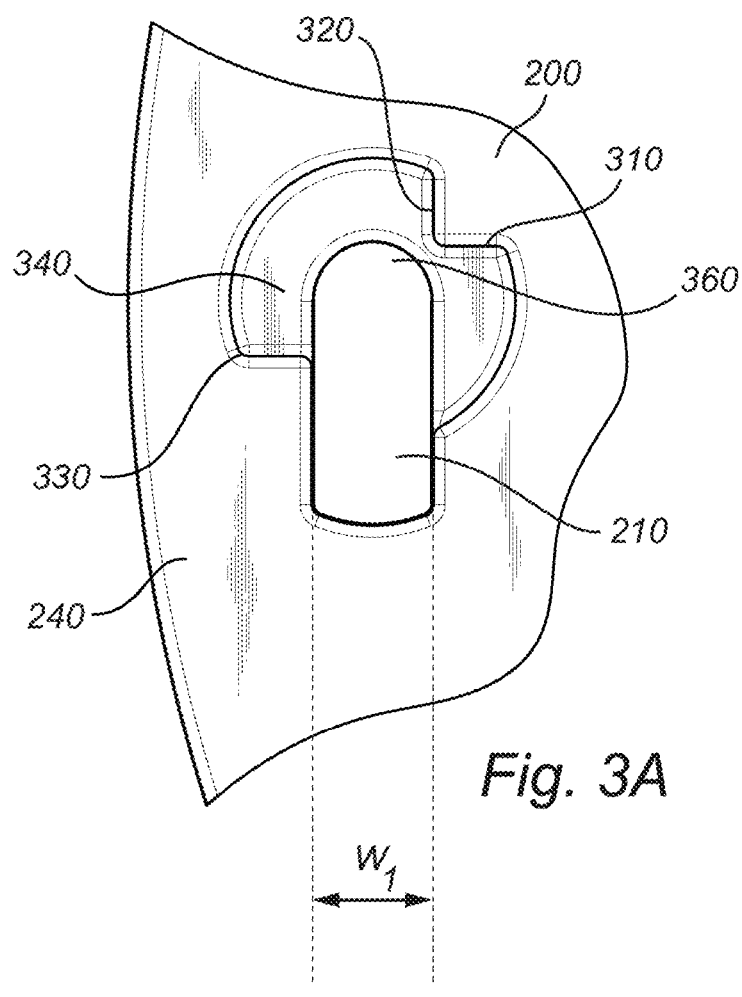
FIG. 3A illustrates a part of an embodiment of a mounting support in a view from the side of the mounting support facing the mounting surface.

To facilitate the rotating movement of the attachment portion 410 in relation to the elongated opening 210 in the mounting support 200, the third part 460 connecting the two legs 420, 430 of the attachment portion 410 may be rounded on one side 490, see FIG. 4B. In addition the corresponding part, 360, of the elongated opening 210 may also be rounded, see FIG. 3A. The width $W_2$ of the third part 460 connecting the two legs 420, 430 of the attachment portion 410 may be further adapted to match the width $W_1$ of the elongated opening 210, so that when the attachment portion 410 is in a rotated position, the third part 460 connecting the two legs 420, 430 of the attachment portion 410 will further aid in restricting the possible movements of the connector 400 in relation to the mounting support 200.

In order to make sure that the connector is rotated in the right direction and to secure the position of the legs 420, 430, when the connector has been rotated into the wanted position, stops 310, 320, 330, 350, are formed on the mounting support 200. The stops may be implemented as indents 340, such as stops 310, 320, 330, or protruding structures, such as stop 350, and are placed adjacent to the elongated opening 210 in the mounting support 200 so that the legs 420, 430 of the attachment portion 410 may abut the stops in a rotated position. In order to secure the attachment portion 410 at least two stops are needed. One located on each lateral side 440, 450, of the attachment portion 410, to stop the motion of the legs 420, 430 of the attachment portion 410 from moving in either direction. The stops may optionally be placed on either side 240, 250, of the mounting support 200.

During the rotation of the attachment portion 410, the first leg 420 is hence adapted to pass over the first stop 350, and after the rotation of the attachment portion 410, the first stop 350 is adapted to abut a first lateral side 440 of the attachment portion 410, and, the second stop 310 is adapted to abut a second lateral side 450 of the attachment portion 410.

In order to improve the stability and robustness of the position of the connector 400 in relation to the mounting support in a mounted position the first leg 420 of the H-shaped attachment portion 410 may be chosen to be longer than the second leg 430. As the second leg 430 needs to be inserted into the elongated opening 210 the length of the elongated opening 210 limits the length of the second leg 430. But the first leg 420 may be chosen to have a longer length than the second leg 430. A relatively long first leg 420 also improves the flexibility in the leg which may be needed in order to pass the first stop 350.

The connector 400 may further also comprise a structure for aiding in the detachment of an attached electronic device 510. A connector 400 comprising a snap fit type of fastener 470 may optionally also comprise a gap or a hole 480 adapted for a flat screwdriver to snap off the electronic device from the snap fit. Another example of such a structure may be a grip adapted for pulling the snap fit to release the electronic device 510.

The connector 400 may be made of a thermoplastic material such as Polyoxymethylene. Thermoplastic materials are flexible materials which offers the possibility of having a fastener portion 470 that uses the flexible feature of the material to create a fastening function such as in a clip, snap fit, spring or the like. Polyoxymethylene is further an example of a thermoplastic material that is production-friendly and has durable material properties.

Figure 3B:
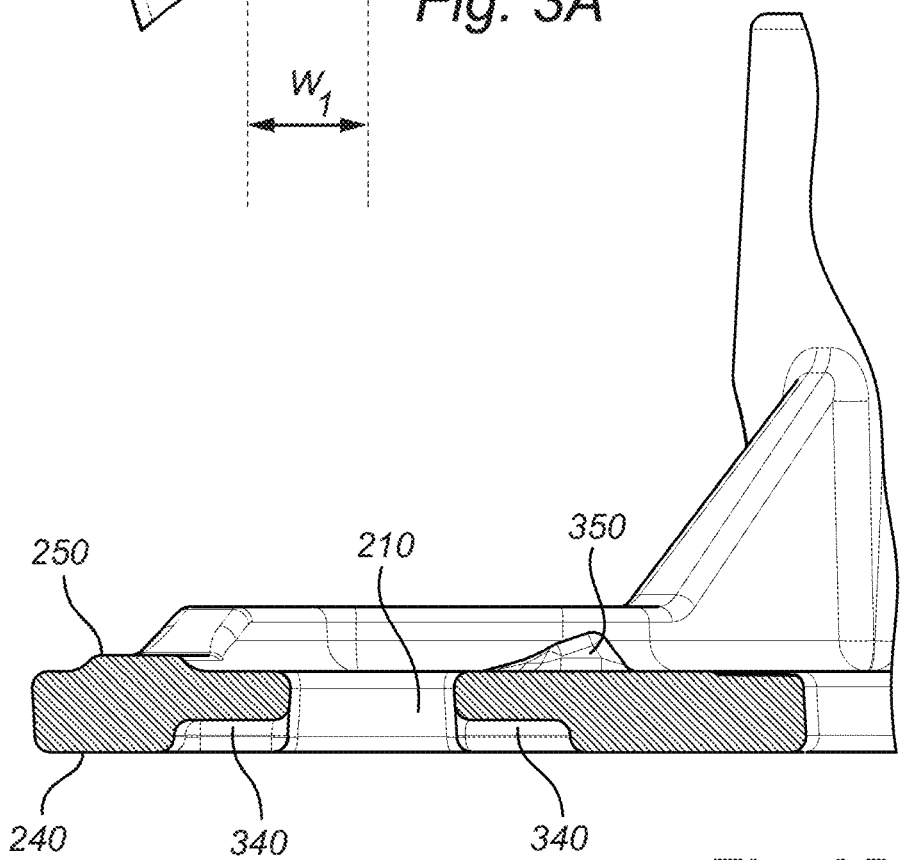
FIG. 3B illustrates a cross section of an embodiment of a mounting support comprising an elongated opening.

FIG. 3B depicts part of a mounting support 200 in a preferred embodiment where the first stop 350, which the first leg 420 of the attachment portion 410 is passing during the rotation, is located on the side 250 of the mounting support 200 facing the person mounting the fastening arrangement 100 to the mounting surface. The person mounting the fastening arrangement 100 to the mounting surface will then be able to visually check that the connector 400 has passed the first stop 350 and is in a secured position.

Further stops 310-330, 350, may be additionally added to the mounting support 200 in order to further facilitate a simple and safe mounting of the connector 400 to the mounting support 200 and/or further improve the stability and robustness of the connector position in relation to the mounting support 200 in a mounted position. E.g., a third stop, 320, obstructing rotation of the attachment portion in a direction opposite of the direction for passing the first leg over the first stop, and/or a fourth stop, 330, adjacent the elongated opening, 210, of the mounting support may be added to the mounting support 200. These stops 320, 330, may be placed on either side 240, 250, of the mounting support 200.

The stops may be added to the mounting support in various ways, e.g., as a protruding structure, protruding from either side 240, 250, of the mounting support 200. An alternative structure for a stop may be an indent 340 in the mounting support 200. The indent type of stop structure may of course be placed on either side 240, 250, of the mounting support and so may the protruding structure. However, it may be advantageous to have indents 340 as stops 310-330 on the side 240 of the mounting support facing the mounting surface as the leg 430 of the attachment portion then may completely fit into the indent 340 without having any parts protruding from the plane corresponding to this side 240 of the mounting support 200. Protruding parts might otherwise cause problems with the stability in the mounting of the mounting support 200 to the mounting surface.

In an alternative embodiment of the fastening arrangement 100 the H-shaped fastener portion 410 may be integrated with the mounting support 200 and the elongated opening 210 may form part of the connector 400 further comprising the fastener portion 470. The same features and advantages as has been earlier described for the fastening arrangement may be analogously applied to this embodiment. The stops 310-330, 350, may in this embodiment form part of the connector 400, in similar positions in relation to the elongated opening 210 as what has been earlier described. There are various options for how to integrate the H-shaped attachment portion 410 in the mounting support 200. One of the legs 420 or 430 of the H-shaped structure may for example be completely integrated into the mounting support 200. Alternatively, the structure of the second leg 430 may be kept, but attached to the mounting support 200.

In the first mentioned alternative, where the second leg 430 is completely integrated in the mounting support 200, the second stop 310 will be placed on the same side of the mounting support 200 as the first stop 350. Further stops, 320, 330, added in further alternatives of this embodiment would also be placed on the same side of the mounting support 200 as the first stop 350.

Figure 5:
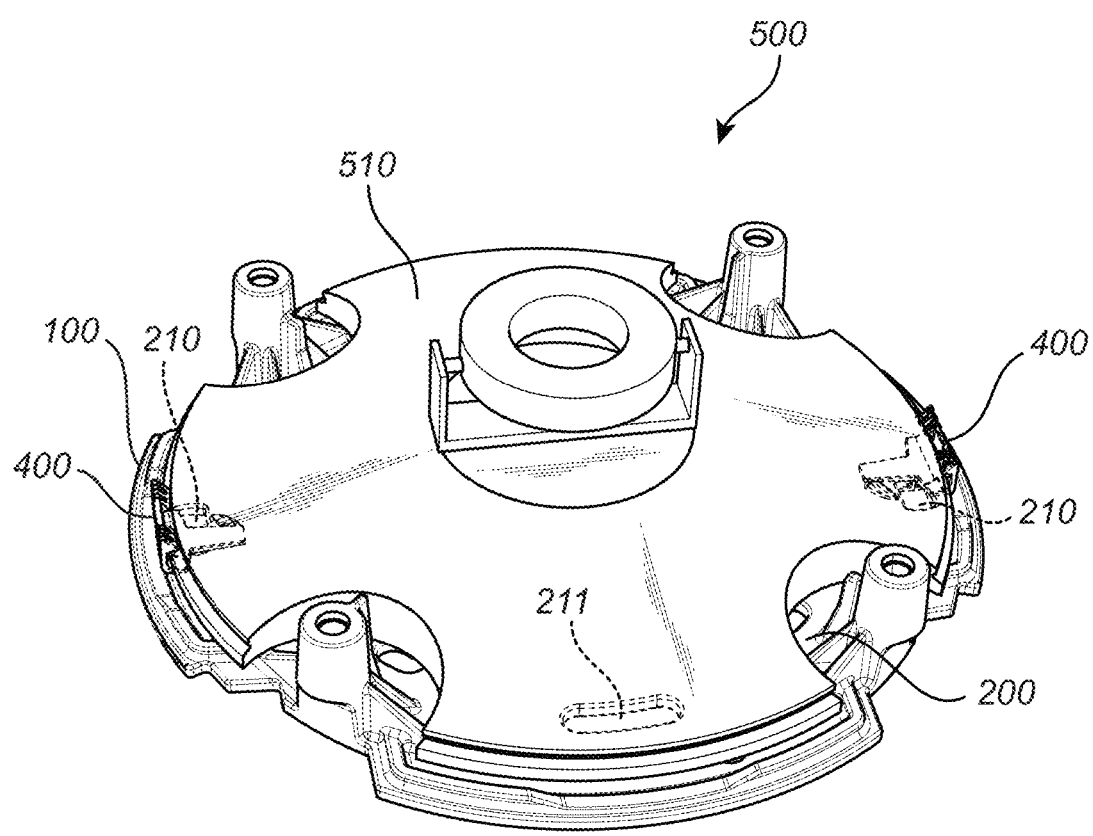
FIG. 5 illustrates an embodiment of an assembled fastening arrangement kit comprising a mounting support, connector and an electronic device.

A fastening arrangement kit 500 will now be described with reference to FIG. 5, illustrating an embodiment of an assembled fastening arrangement kit 500. The fastening arrangement kit 500 comprises a fastening arrangement 100 and an electronic device 510, according to what has been earlier described. The mounting support 200 has, according to what has been earlier described for the mounting support 200 of the fastening arrangement 100, at least one elongated opening 210 offering at least one mounting position set-up for the electronic device 510. In the example illustrated in FIG. 5, the mounting support 200 has two elongated openings 210. As an option the mounting support may have a second elongated opening 211, offering the possibility to mount the electronic device in a second mounting position set-up according to the position of the second elongated opening.

An example of a scenario where this would be useful is when mounting a monitoring camera, and in particular monitoring cameras comprising a dome viewing window. The mounting support may then have specific openings 230 for attaching the mounting support 200 to the mounting surface. Due to the mounting surface there may only be one viable way of orientating the mounting support 200. E.g., when mounting a monitoring camera to a pole the metal ties need to pass in a specific position locking the orientation of the mounting support. A similar scenario may also exist for mounting to a surface by using screws or bolts. The monitoring camera might however need to monitor a scene at an angle to the orientation of the mounting support 200. There is hence a need for having the possibility to alter the relative position of the monitoring camera to the mounting support in an easy way without the need of extra equipment.

By having additional elongated openings, 211, the connector, 400, may be placed in any of the elongated openings, 210, 211, and hence the relative position of the electronic device 510 and mounting support 200 may be adjusted.

During the mounting procedure of electronic devices 510, such as a monitoring camera in the example above, there are typically cables that need to be connected and hardware adjustments, like adjustment of focus of a camera lens, that need to be made before fixing the dome viewing window. In these cases there is a need for temporary fastening arrangement before fastening the electronic device with, e.g., screws or bolts that fix the dome viewing window and hence the whole monitoring camera to the mounting support. The fastening arrangement 100 may then be used as a temporary fastening arrangement during installation of the monitoring camera. The fastening arrangement may in this example then be further strengthened by, e.g., screws and bolts when fixing the dome viewing window. This was an illustrative example of one use case for the fastening arrangement according to the invention, similar and other examples of uses may of course be extrapolated from this examples for other types of electronic devices.

It will be appreciated that a person skilled in the art can modify the above described embodiments in many ways and still use the advantages as shown in the embodiments above.

As described above, the mounting support may have two or more sets of elongated openings for attaching the connector, and these may be used for mounting the electronic device in different orientations. Multiple sets of elongated openings could also be used for mounting different electronic devices using the same mounting support. For instance, a first set of elongated openings could be used when mounting a first model of monitoring camera, and a second set of openings could be used when mounting a second model of monitoring camera. In this way, the number of different mounting supports a manufacturer needs to provide may be reduced.

Thus, the teachings herein should not be limited to the shown embodiments but should only be defined by the appended claims. Additionally, as the skilled person understands, the shown embodiments may be combined.

Figure 6:
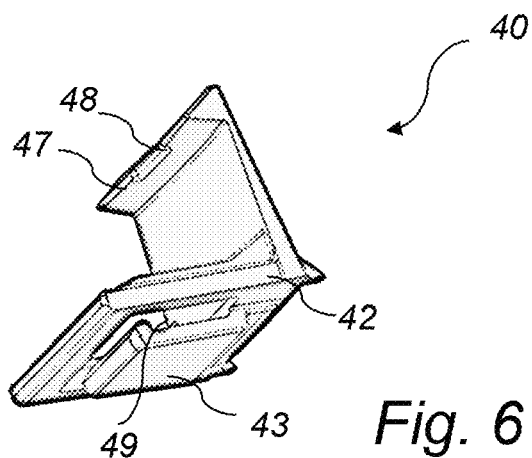
FIG. 6 illustrates an embodiment of a connector, which is not according to the invention.
Figure 7:
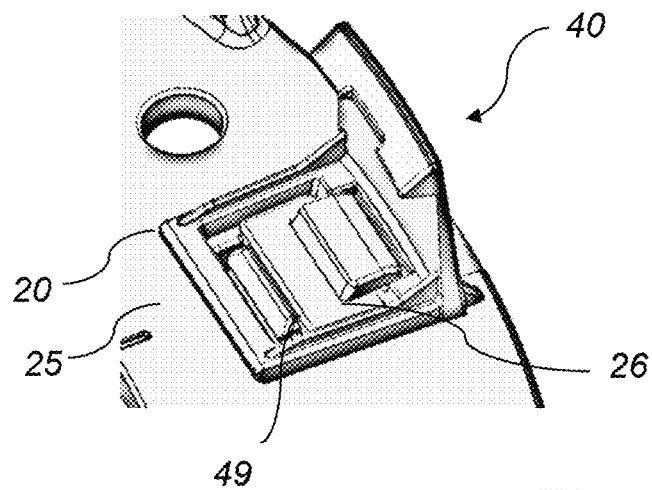
FIG. 7 illustrates a part of a mounting support with the connector of FIG. 6 attached.
Figure 8:
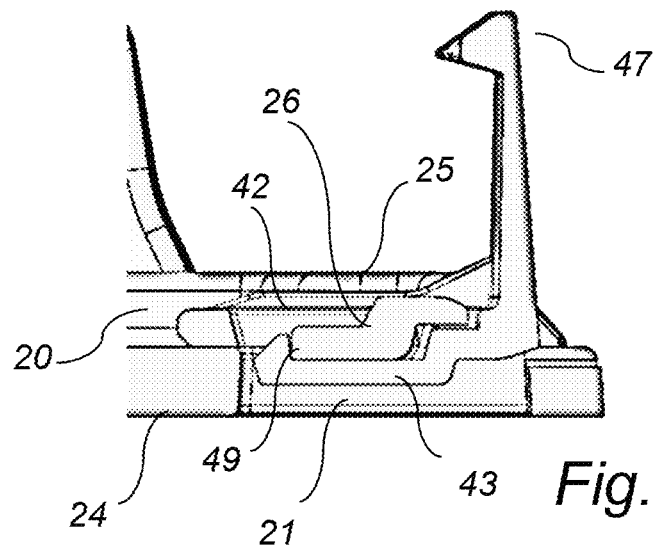
FIG. 8 illustrates a cross section of the mounting support and connector of FIG. 7.

FIG. 6 shows an alternative connector 40, which can be used in a similar way as the connector 400 discussed above as an example of an embodiment of the invention. Like the connector 400, the alternative connector 40 has a fastener portion 47 with a hole 48 for inserting a flat screwdriver to snap off an electronic device fastened using the alternative connector 40 from the snap fit. The alternative connector 40 has a first leg 42 and a second leg 43. As may be seen in FIGS. 7 and 8, the first and second legs are intended to sandwich the mounting support 20 between them, with the second leg 43 on the side 24 facing the mounting surface (not shown), and the first leg 42 on the other side 25, facing the electronic device (not shown). The opening 21 in which the alternative connector 40 is attached is of a different shape than the elongated opening 210 shown in FIGS. 1 and 2, and is specifically adapted to the alternative connector 40. Across the opening 21 shown in FIGS. 7 and 8, a web 26 is formed, under which the second leg 43 of the alternative connector 40 is arranged when the alternative connector has been attached to the mounting support 20.

Unlike the connector described above in connection with FIGS. 1-5, the alternative connector 40 is not rotated in place for attaching, but is simply snapped in place by inserting the second leg 43 under the web 26. When an electronic device is snapped on the mounting support by means of the fastener portion 47 of the alternative connector 40, the alternative connector 40 is held securely in place, e.g., by a hook portion 49 on the second leg 43. When a lateral force is exerted on the fastener portion 47 of the alternative connector 40, the second leg 43 presses against the web 26.

Once attached in the opening 21, the alternative connector 40 functions in the same way as the connector 400 of FIGS. 1-5 and it may be embodied in essentially the same ways.

The invention claimed is:

1. A fastening arrangement comprising a mounting support and a connector,
   wherein the mounting support:
   is adapted for attachment to a mounting surface,
   has an elongate opening,
   has a first stop adjacent the opening on a first side of the mounting support, and,
   has a second stop adjacent the opening on the first, or a second side of the mounting support, and,
   wherein the connector:
   has a fastener portion,
   has an H-shaped attachment portion, the attachment portion
   having a length which is longer than a width of the opening in
   the mounting support, and
   wherein by insertion of the attachment portion in the elongated opening in the mounting support, and rotating the attachment portion, the attachment portion is adapted to be arranged with;
   a first leg of the H-shaped attachment portion arranged on the first side of the mounting support, and
   a second leg of the H-shaped attachment portion arranged on the second side of the mounting support, and
   wherein during rotation of the attachment portion, the first leg is adapted to pass over the first stop, and after the rotation of the attachment portion;
   the first stop is adapted to abut a first lateral side of the attachment portion, and the second stop is adapted to abut a second lateral side of the attachment portion,
wherein the first and second lateral sides are located on opposite sides of the attachment portion.

2. The fastening arrangement according to claim 1, wherein the fastener portion of the connector is fixed to the first leg of the H-shaped attachment portion.

3. The fastening arrangement according to claim 1, wherein the mounting support has a third stop adjacent the elongated opening on the first, or the second side of the mounting support for obstructing rotation of the attachment portion in a direction opposite of the direction for passing the first leg over the first stop.

4. The fastening arrangement according to claim 1, wherein the mounting support has a fourth stop adjacent the elongated opening on the first, or the second side of the mounting support.

5. The fastening arrangement according to claim 1, wherein the second stop is arranged as part of an indent in the second side of the mounting support.

6. The fastening arrangement according to claim 5, wherein the third stop and fourth stop are arranged as parts of the indent on the second side of the mounting support.

7. The fastening arrangement according to claim 1, wherein the first leg of the H-shaped attachment portion is longer than the second leg of the H-shaped attachment portion.

8. The fastening arrangement according to claim 1, wherein the mounting support is made of a metallic material.

9. The fastening arrangement according to claim 1, wherein the connector is made of a thermoplastic material.

10. The fastening arrangement according to claim 9, wherein the thermoplastic material is Polyoxymethylene.

11. The fastening arrangement according to any one of claim 1, wherein the fastener portion of the connector comprises at least one of a snap fit element, a clamp, a cable holding element, a spring element and a distance element.

12. A fastening arrangement kit comprising a fastening arrangement according to claim 1 and an electronic device, wherein the electronic device is arranged to be secured to the mounting support in a first setup according to the location of the elongated opening.

13. The fastening arrangement kit according to claim 12 wherein the electronic device comprises at least one of a camera, an imaging sensor, a physical access control server, a card reader, a radio signal transceiver, a loudspeaker, a PIR sensor, a RADAR unit, a microphone.

14. The fastening arrangement kit according to claim 12, wherein the mounting support of the fastening arrangement comprises a second elongated opening arranged in a second location on the mounting support, wherein the electronic device is arranged to be secured to the mounting support in a second setup by attaching the connector to the second elongated opening.

15. Use of a fastening arrangement kit according to claim 12 for mounting the electronic device to a mounting surface.

* * * * *